| United States Patent [19] | [11] | 4,278,144 |
|---|---|---|
| Perin | [45] | Jul. 14, 1981 |

[54] REVERSIBLE DRIVING STATION FOR TRACTOR VEHICLE

[75] Inventor: Philippe Perin, Meudon, France

[73] Assignee: Fiat Trattori S.p.A., Modena, Italy

[21] Appl. No.: 84,344

[22] Filed: Oct. 12, 1979

[51] Int. Cl.$^3$ .................. B60K 26/00; B60N 1/02; B60N 1/08

[52] U.S. Cl. .................. 180/329; 180/330; 180/89.13; 280/775; 297/349

[58] Field of Search .......... 180/77 R, 315, 77 K, 180/323, 77 L, 326, 77 P, 329, 77 N, 330, 77 Q, 331, 78, 89.1, 89.12, 89.13; 280/775; 297/349

[56] References Cited

U.S. PATENT DOCUMENTS

| 2,384,890 | 9/1945 | Coldwell | 180/77 P |
|---|---|---|---|
| 3,195,913 | 7/1965 | Hallsworth | 280/775 |
| 3,347,558 | 10/1967 | Grimes et al. | 280/775 |
| 3,412,968 | 11/1968 | Rose et al. | 297/349 |
| 3,583,518 | 6/1971 | Bichel et al. | 180/89.1 |
| 3,737,003 | 6/1973 | Beals et al. | 280/775 |
| 4,059,171 | 11/1977 | Pakosh | 297/349 |
| 4,134,617 | 1/1979 | Matsubara | 297/349 |

*Primary Examiner*—David M. Mitchell
*Assistant Examiner*—Donn McGiehan
*Attorney, Agent, or Firm*—Sughrue, Rothwell, Mion, Zinn and Macpeak

[57] ABSTRACT

A tractor vehicle has a driving station including a driver's seat and steering console which is mounted on a base for swivelling movement about a vertical axis through 180° between a tractor configuration and a pushing power unit configuration. In the latter configuration the driving station is supported on a higher tractor cab floor level to enable the driver to see over equipment being pushed. The driving station has a support which is connected to the tractor cab floor by at least one parallelogram linkage and weight compensating springs which lift the support off the cab floor.

3 Claims, 4 Drawing Figures

REVERSIBLE DRIVING STATION FOR TRACTOR VEHICLE

The present invention relates a reversible driving station for tractor vehicles, particularly tractor vehicles of the so-called polyvalent type.

A polyvalent tractor vehicle is operable in a first configuration as an agricultural tractor and in a second configuration as a power unit for pushing mobile equipment.

In such a polyvalent tractor vehicle the direction of advance of the vehicle when used as a tractor is opposite to the direction of advance when the vehicle is used as a power unit. It is therefore necessary to provide such a vehicle with a readily reversible driving station.

When the vehicle is used as a tractor the level of the driving station is substantially the same of that of a standard tractor. When, however, the vehicle is used as an equipment-pushing power unit, the driving station is at a higher level, in order to improve the driver's visibility over the equipment driven by the power unit.

An object of the invention is to provide a tractor vehicle driving station which is readily adaptable to operation in the two different modes while providing different levels for the driving station in the two modes.

According to the present invention there is provided a reversible driving station for a tractor vehicle, capable of occupying, selectively, a position for use as a tractor and a relatively higher position for use as a pushing power unit, characterised in that the vehicle has a cab floor with two different levels on which the driving station supported in its respective tractor and power unit configurations, the driving station being connected to said floor by means for reversing the position of the driving station.

Preferably the driving station is mounted rotatably on an intermediate support member for rotation about a vertical swivel axis in order to orientate the driving station in the direction appropriate to the working configuration of the vehicle.

In order to facilitate the rotation of the driving station through 180° within the confines of the driver's cab the steering wheel of the vehicle is preferably mounted on a console which may be hinged about a horizontal axis towards the driver's seat in order to reduce the overall width of the driving station for swivelling of the latter between its working configurations.

The invention will be further described, by way of example, with reference to the accompanying drawings, in which.

Figure 1:
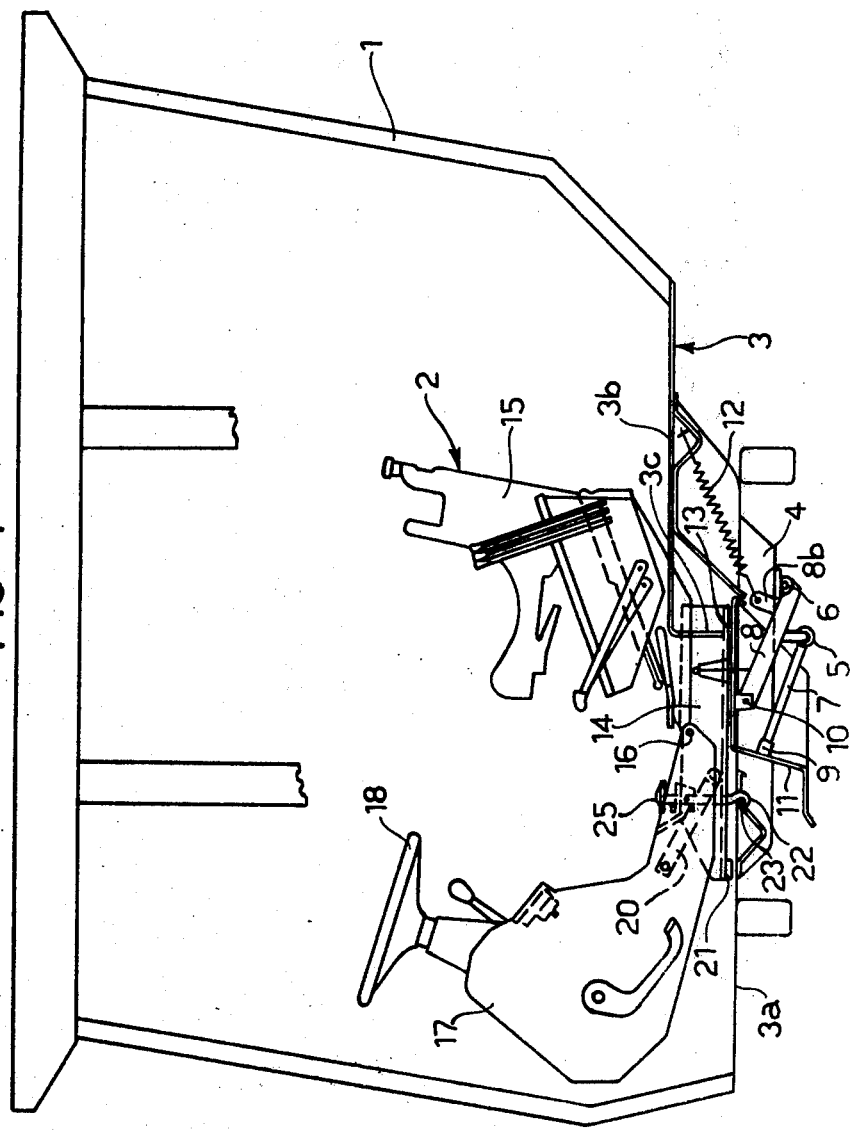
FIG. 1 is a side elevational view of a driving station according to one embodiment of the invention for a polyvalent tractor vehicle, shown in its configuration ready for use as a tractor.
Figure 2:
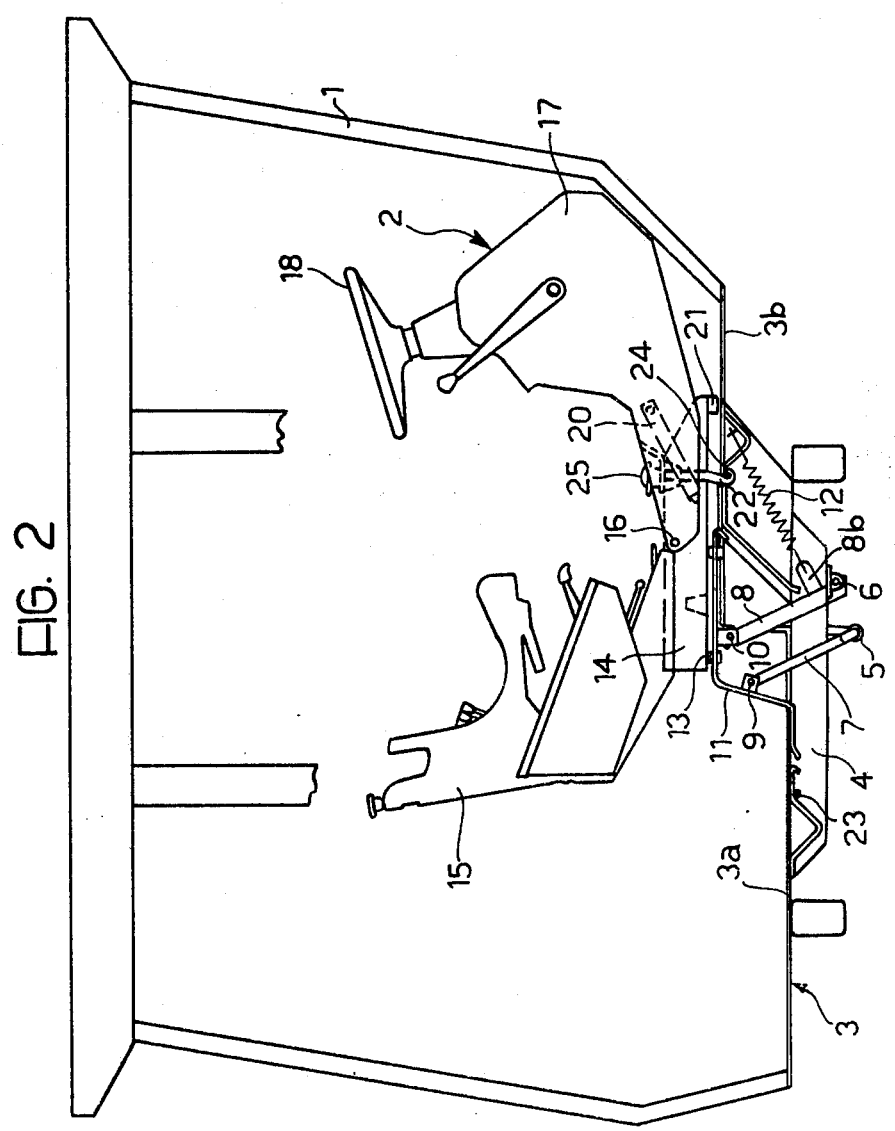
FIG. 2 is a side elevational view of the driving station of FIG. 1 in its configuration ready for use as a pushing power unit.
Figure 3:
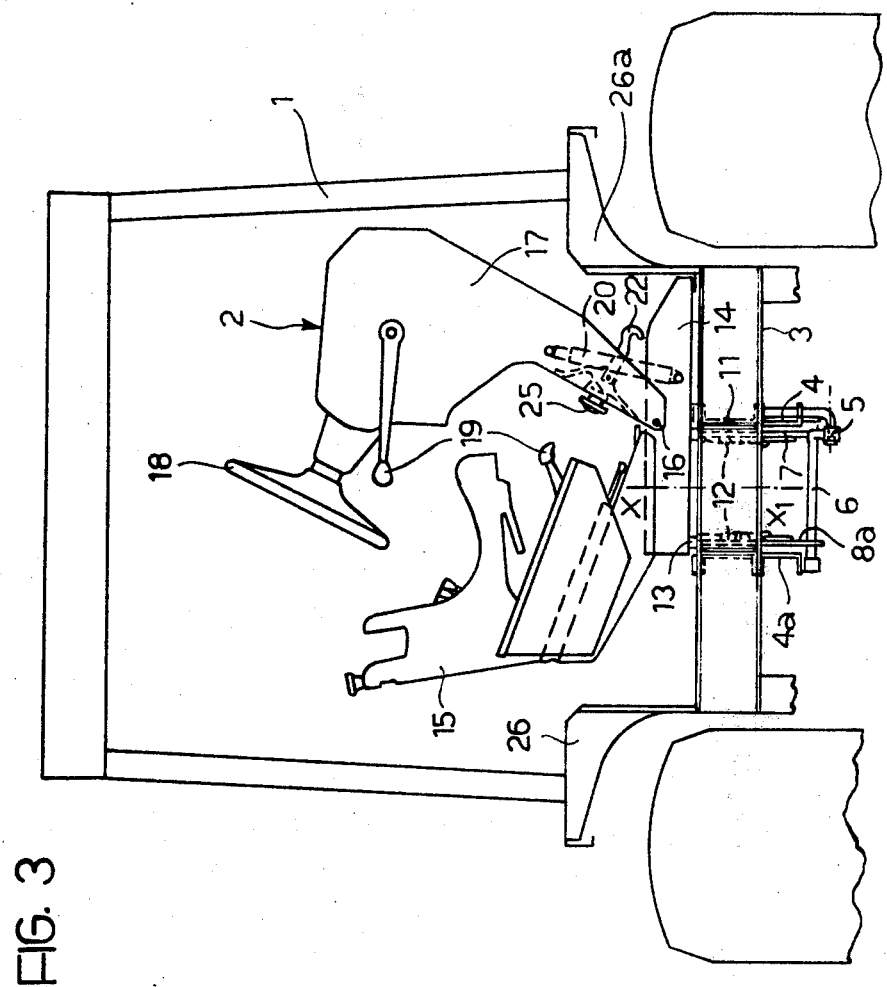
FIG. 3 is an end elevational view of the vehicle, showing the driving station in an intermediate position during transition from one to the other of the configurations shown in FIGS. 1 and 2.

FIGS. 1, 2, 3 show diagrammatically a cab 1 of a polyvalent tractor vehicle capable of being used selectively either as a tractor or as an implement-pushing power unit. A reversible driving station 2 is mounted on a floor 3 which has a lower level 3a on which the driving station 2 rests in the tractor configuration (FIG. 1) and a higher level 3b on which the driving station rests in the implement-pushing power unit configuration (FIG. 2) of the vehicle.

Two longitudinally extending channel section members 4, 4a are fixed to the floor 3 and support transverse pivot shafts 5, 6 to which one end of a connecting rod 7 and of a pair of connecting rods 8, 8a are respectively articulated. The other ends of the rods 7 and 8, 8a are pivotally connected by pivot pins 9 and 10 respectively to an intermediate support member 11 on which the driving station 2 is mounted. The connecting rods 7, 8 and 8a form a parallelogram linkage and are so arranged that the axis of one of the pivot shafts 5 is situated in the plane of a step 3c which unites the two floor levels 3a and 3b.

Figure 4:
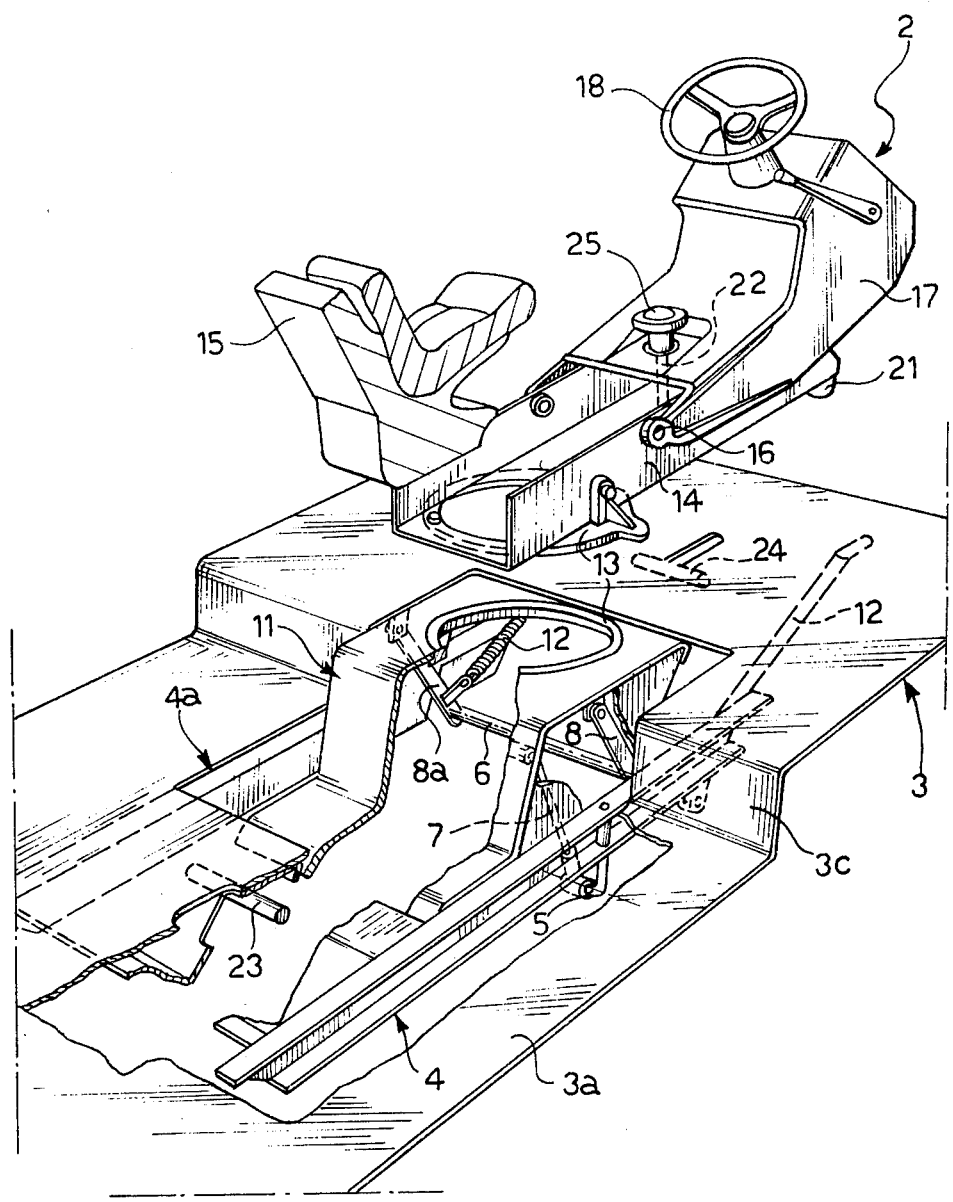
FIG. 4 is an "exploded" partly cut-away perspective view of the driving station shown in FIGS. 1 to 3.

A lug 8b is secured to one of the connecting rods, 8 of the pairs of rods 8, 8a adjacent the pivot shaft 16. The lug 8b provides an anchorage for one of the ends of a helical spring 12 the other end of which is secured on to the floor 3. The other connecting rod 8a is similarly connected to the floor 3 by means of a respective spring 12, as shown in FIGS. 3 and 4.

The springs 12, which serve to counteract the weight of the driving station 2, may be replaced by any other equivalent mechanical or hydraulic weight compensating means. The compensating springs 12 may apply to the driving station a force slightly exceeding the weight of the driving station, so as to maintain the latter in a raised position.

The intermediate support member 11 supports for rotation about a vertical swivel axis $X—X_1$ a circular mounting ring 13 on a channel section base 14 of the driving station 2. A support for a driver's seat 15 is carried at one end of the base 14, which also supports, for pivotal movement about a horizontal axis 16, a console 17 supporting a steering wheel 18.

The mounting ring 13 has a large diameter, and the connecting rods 7, 8 and 8a are sufficiently spaced apart, to leave a central space through which flexible control cables and like elements (not shown) may pass from control levers 19 on the console 17 to the vehicle and its engine.

Rotation of the driving station base 14 about the vertical axis $X—X_1$ is limited to 180° by stops (not shown) in order to prevent damage due to twisting of the flexible control cables and like elements.

Between the control console element 17 and the base 14 there are arranged two spring members 20, on opposite sides of the console, which compensate for the weight of the console 17, avoiding unnecessary strain on the part of the user when lifting the console about its horizontal pivot axis 16. The spring members 20, which are articulated at their opposite ends to the base 14 and to the console 17 respectively, comprise respective compression springs enclosed in telescopic tubular housings.

Elastic shock absorber elements 21 of rubber are attached to the base 14 and positioned so as to come into contact with the floor 3. The action of the weight compensating springs 12, however, is such as to raise the driving station 2 a little above the floor 3, preventing the elastic elements 21 from coming into contact with the floor during rotation of the base 14 about its swivel axis $X—X_1$.

The base 14 carries means for locking the driving station 2 to the floor 3. The locking means comprise a hook 22 which may be engaged selectively with front and rear transverse anchorage rods 23 or 24 fixed to the floor 3, in the tractor power unit configurations respectively. The hook 22 is connected to a control handle 25 which can be screwed down by the driver to lock the hook 22 in engagement with one or the other of the anchorage rods 23 or 24.

A safety interlock device (not shown) prevents the starting of the engine of the vehicle if the hook 22 is not in a locked position.

The illustrated embodiment of the invention operates in the following manner.

The driving station 2 is shown in the tractor configuration in FIG. 1. To convert the station to the power unit configuration shown in FIG. 2 the driver first unlocks the base 14 by turning the control handle 25 to disengage the hook 22 from the anchorage rod 23. The entire driving station 2 is then raised by means of the connecting rods 7, 8 and 8a from the floor level 3a to the floor level 3b. The steering console 17 is then lifted so that it hinges about its pivot axis 16 into a raised position (FIG. 3) in which the overall width of the driving station is reduced. The entire station 2 can then be swivelled about the vertical axis $X-X_1$ without touching the two sides 26, 26a of the cab 1, the station 2 being rotated through 180° about the swivel axis $X-X_1$. The steering console 17 is then lowered, rotating about its pivot axis 16, into the position shown in FIG. 2, and the hook 22 is then engaged with the anchorage rod 24 by rotation of the control handle 25.

The driving station is then ready for use in the power unit configuration for pushing agricultural or other equipment.

What is claimed is:

1. In a tractor of the type having a reversible driving station on the frame of the tractor, the improvement comprising an intermediate support member for said driving station, linkage means pivotally mounting said intermediate support member on said frame for movement between a higher level and a lower level, a driving station base member rotatably mounted on said intermediate support member, seat means secured to said base member and control console means pivotally mounted on said base member in front of said seat means for movement between a first position wherein said console means is spaced from said seat means in operative position and a second position adjacent said seat means to facilitate rotation of said driving station within a narrow cab on said tractor.

2. In a tractor as set forth in claim 1 wherein said linkage means is comprised of two pairs of connecting rods forming a parallelogram linkage and further comprising weight compensating spring means connected between said frame and said connecting rods.

3. In a tractor as set forth in claim 1 further comprising locking means for securing said intermediate support member to said frame at said higher level and at said lower level.

* * * * *